(12) United States Patent
Shelton (10) Patent No.: US 12,102,231 B1
(45) Date of Patent: Oct. 1, 2024

(54) STABILIZER BRACKET FOR ELECTRONIC DEVICE

(71) Applicant: SHELTON SPECIALTIES, LLC, Vincennes, IN (US)

(72) Inventor: David Shelton, Vincennes, IN (US)

(73) Assignee: Shelton specialties, LLC, Vincennes, IN (US)

( * ) Notice: Subject to any disclaimer, the term of this patent is extended or adjusted under 35 U.S.C. 154(b) by 0 days.

(21) Appl. No.: 18/403,909

(22) Filed: Jan. 4, 2024

(51) Int. Cl.
*A47B 97/00* (2006.01)
*G06F 1/16* (2006.01)

(52) U.S. Cl.
CPC ............ *A47B 97/00* (2013.01); *G06F 1/1637* (2013.01); *A47B 2097/005* (2013.01)

(58) Field of Classification Search
CPC .............. A47B 97/00; A47B 2097/005; A47B 2097/006; G06F 1/1637; H05K 5/0204; A47F 5/0025; A45F 5/00
USPC ........................................ 248/205.1; 348/836
See application file for complete search history.

(56) References Cited

U.S. PATENT DOCUMENTS

| | | | |
|---|---|---|---|
| 3,091,378 A * | 5/1963 | O'Dwyer ............ | A63B 71/0672 224/668 |
| 3,294,298 A * | 12/1966 | Danielson ................. | A45F 5/00 224/904 |
| 4,747,570 A * | 5/1988 | Takahashi ............... | B60R 11/02 220/8 |
| 4,948,022 A * | 8/1990 | VanDyke ................ | B60R 7/088 224/543 |
| 5,317,691 A | 5/1994 | Traeger | |
| 5,388,741 A * | 2/1995 | Hillinger .................. | A45F 5/02 206/349 |
| D371,119 S | 6/1996 | Youens et al. | |
| 6,497,368 B1 * | 12/2002 | Friend .................. | G06K 7/0004 235/472.01 |
| 6,983,126 B1 * | 1/2006 | Saalman .................. | H04N 5/60 455/66.1 |
| 7,641,163 B2 * | 1/2010 | O'Keene ................ | F16M 11/10 248/920 |
| D663,734 S | 7/2012 | Radin et al. | |
| D678,287 S | 3/2013 | Hsu et al. | |
| 8,479,960 B2 * | 7/2013 | Lopez-Apodaca ......................... | B60R 11/0241 224/679 |
| D692,008 S | 10/2013 | Feldstein et al. | |
| 8,644,011 B2 * | 2/2014 | Parkinson ............. | G06F 1/1626 455/575.1 |

(Continued)

FOREIGN PATENT DOCUMENTS

| CN | 213688387 | 8/2020 |
|---|---|---|
| CN | 219550149 | 3/2023 |

Primary Examiner — Nkeisha Smith
(74) Attorney, Agent, or Firm — Martin IP Law Group; C. Richard Martin (57) ABSTRACT

A device that stabilizes the connection between the encoder and the tablet of an e-poll book system is provided. The device prevents disconnection of the encoder and/or wear on the connectors between the encoder and tablet that can result in failure of the system. The stabilizer bracket includes a first, primary opening or pocket that is sized to receive the body of the encoder therein and includes an opening that allows the user to see and encoder indicator light on the front face of the encoder 20. A pair of tabs extend from the rear face of the stabilizing bracket, and a shorter pair of tabs extend from the front face of the stabilizing bracket to provide stability.

9 Claims, 9 Drawing Sheets

(56) References Cited

U.S. PATENT DOCUMENTS

| | | | |
|---|---|---|---|
| 8,733,606 B2* | 5/2014 | Felts | F42B 39/02 |
| | | | 224/679 |
| D709,511 S | 7/2014 | Sparks et al. | |
| 9,097,489 B2* | 8/2015 | Chiang | F41C 27/00 |
| 9,408,465 B2* | 8/2016 | Dowling | H05K 5/0217 |
| 9,543,082 B1* | 1/2017 | Wengreen | H04N 5/64 |
| 9,686,390 B2* | 6/2017 | Brewer | A45C 13/24 |
| 10,039,201 B2* | 7/2018 | Wengreen | H05K 7/14 |
| 10,117,344 B2* | 10/2018 | Wengreen | F16M 11/041 |
| 10,197,370 B2* | 2/2019 | Zhang | F42B 39/02 |
| 10,299,400 B2* | 5/2019 | Wengreen | H05K 5/0204 |
| 10,575,427 B2* | 2/2020 | Wengreen | G06F 1/20 |
| 10,663,108 B2* | 5/2020 | Yamamori | F16M 11/04 |
| 10,774,982 B2* | 9/2020 | Sung | F16M 11/04 |
| 11,375,813 B2 | 7/2022 | Holt | |
| 11,415,264 B2* | 8/2022 | Bullock | H05K 5/0204 |
| 11,572,978 B2* | 2/2023 | Cockburn | A47G 1/17 |
| 2002/0079864 A1* | 6/2002 | Soumi | H04N 23/50 |
| | | | 348/E5.042 |
| 2005/0211861 A1* | 9/2005 | Lee | G06F 1/1607 |
| | | | 348/E5.128 |
| 2012/0280014 A1* | 11/2012 | Lopez-Apodaca | |
| | | | B60R 11/0241 |
| | | | 224/539 |
| 2014/0061406 A1* | 3/2014 | Chevalier | F16M 11/08 |
| | | | 248/205.1 |
| 2014/0103179 A1* | 4/2014 | Lipke | F16M 11/041 |
| | | | 248/231.91 |
| 2015/0129724 A1* | 5/2015 | Kohmoto | F16M 13/00 |
| | | | 248/316.4 |
| 2015/0212544 A1* | 7/2015 | Chen | G06F 1/1607 |
| | | | 248/314 |
| 2016/0081209 A1* | 3/2016 | Brewer | A45F 5/00 |
| | | | 248/314 |
| 2022/0112979 A1* | 4/2022 | Wengreen | H04R 1/026 |

* cited by examiner

STABILIZER BRACKET FOR ELECTRONIC DEVICE

BACKGROUND OF THE INVENTION

Field of the Invention

This disclosure relates generally to brackets for stabilizing electronic devices, and more particularly to a bracket for use in connection with an electronic poll book.

Description of the Related Art

As states explore new technologies to facilitate the voting process, the use of electronic poll books (e-poll books) is becoming increasingly prevalent. Traditionally, voting jurisdictions have had paper poll books that contain a list of eligible voters in the district or precinct. E-poll books, which typically come in the form of a laptop or tablet, are replacing the old paper poll books at many voting locations. In addition to the ability to look up eligible voters, e-poll books typically allow voters to sign in electronically and can scan a driver's license to pull up a voter's information. E-poll books can reduce the time spent checking in voters, which is one of the biggest sources of delay at the polling place on election day.

Figure 1:
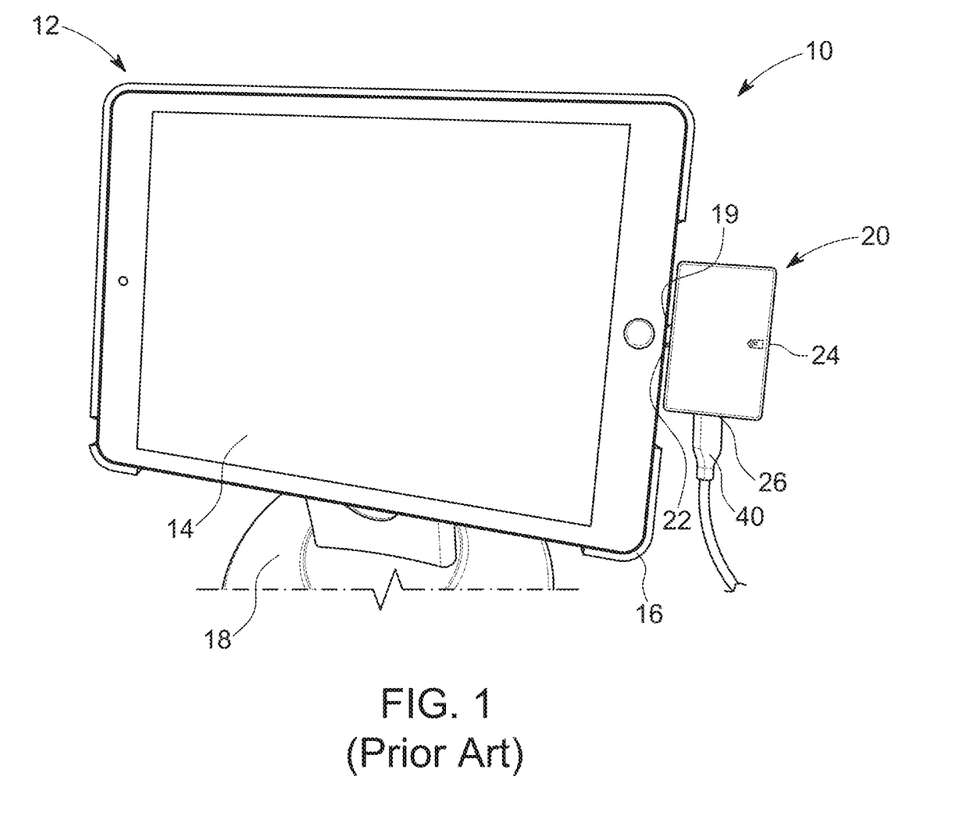
FIG. 1 is a front perspective view of an e-poll book with an encoder attached to the dock connector port and a power cord attached to the power port of the encoder according to the prior art.
Figure 2:
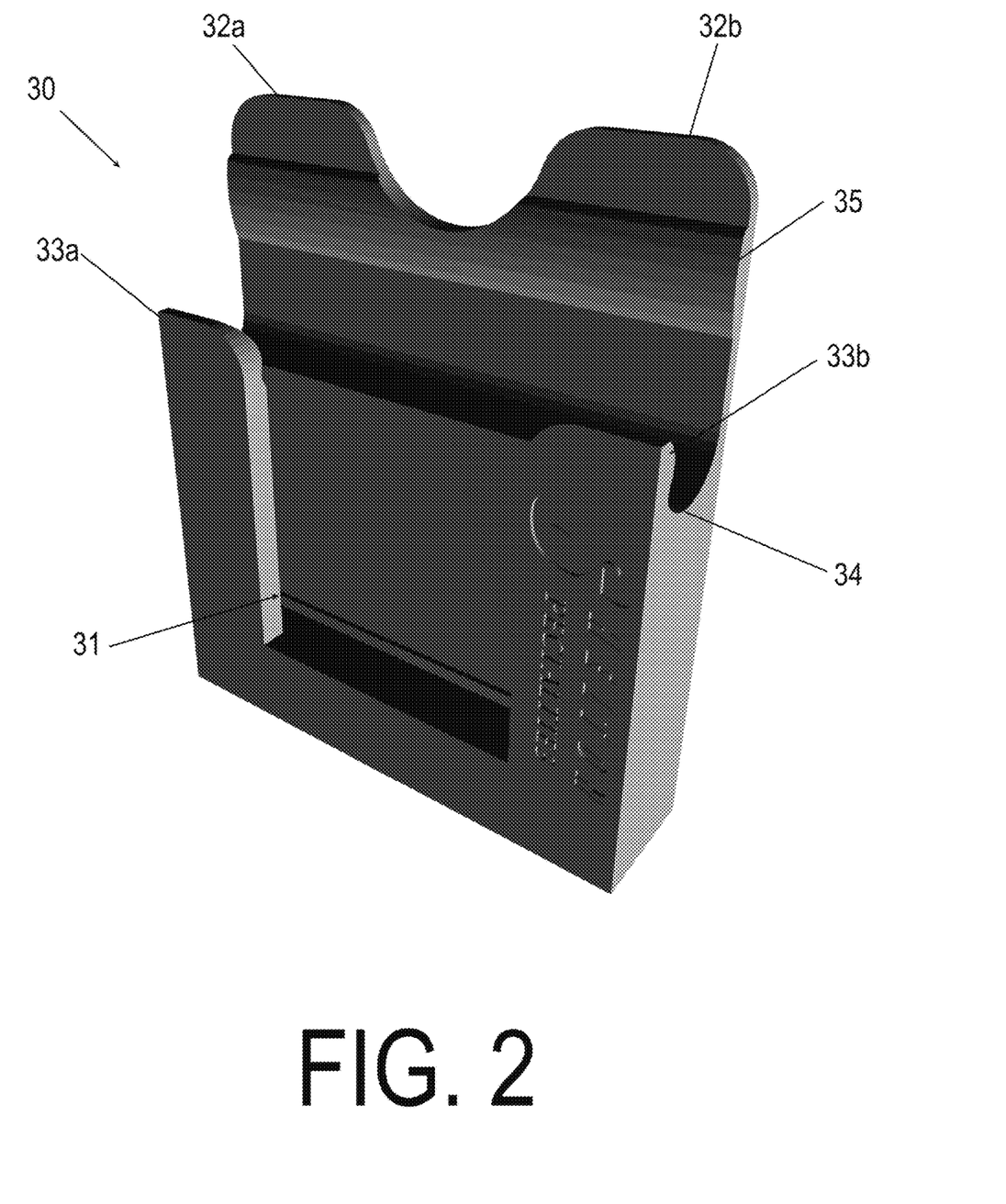
FIG. 2 is a front upper right perspective view of the stabilizer bracket according to a preferred embodiment of the invention.

FIG. 1 shows a typical setup of one e-poll book system 10 that is commonly used at polling locations in elections. The system includes a tablet computer 12 having a touchscreen display 14 and a case 16 for housing the internal circuitry, hardware and software necessary to perform the functions required. A stand 18 is typically used to provide consistent access to the the touchscreen 14 to voters. A dock connector port 19 may be located in one end of the tablet 12 for connecting a power cord to the tablet 12 or for connecting peripheral devices such as and encoder 20.

The encoder 20 has a plug 22 that connects to the tablet 12 through the dock connector port 19. A voter access card encoder slot 24 is provided in the opposing end of the encoder. An election judge inserts a voter access card in the encoder slot 24 to be encoded for a voter during the check-in procedure. While the tablet 12 typically includes an internal battery, it is advisable to connect the tablet 12 and encoder 20 to an external power source. The encoder 20 includes a connector port 26 for connecting the encoder 20 to an external power source via power cord 40.

One problem associated with the e-poll book system currently in use is the weakness of the connection between the encoder 20 and the tablet 12, which are only supported by the connection between the encoder plug 22 and the tablet dock connector port 19. Repeated insertion and removal of voter access cards into the slot 24 can cause undue stress on the connection between the encoder plug 22 and the tablet dock connector port 19. This may result in the encoder 20 becoming disconnected from the tablet 12. After much repeated use, the connection between the encoder plug 22 and the tablet dock connector port 19 can fail, resulting in the e-poll book system 10 being disabled.

Accordingly, there is a need for a device that stabilizes the connection between the encoder and the tablet of an e-poll book system to prevent disconnection of the encoder and/or wear on the connectors between the encoder and tablet that can result in failure of the system.

SUMMARY OF THE INVENTION

It is therefore an object of the present invention to provide a stabilizer bracket that provides stability to the connection between the encoder and tablet of an e-poll book system.

The present invention meets these objects by providing a stabilizer bracket for an electronic device that provides stability between the peripheral device (encoder) and main device (tablet).

According to one presently preferred embodiment of the invention, there is provided a bracket for stabilizing an encoder coupled to an e-poll book tablet. The bracket includes a front face having an upper end, a lower end, and opposing side edges; a rear face having an upper end, a lower end, and opposing side edges; a bottom face having a first end connected to the lower end of the front face and a second end connected to the lower end of the rear face; and a pair of side faces, each having an upper end, a first side edge connected to one of said opposing side edges of the front face, a second side edge connected to one of said opposing side edges of the rear face, and a lower end connected to opposing edges of the bottom face, wherein said front face, rear face and side faces form a pocket having dimensions approximating the outer dimensions of the encoder. The bracket further includes one or more rear tabs extending upwardly from the upper end of the rear face, said rear tabs configured to engage a rear surface of the e-poll book tablet when installed; and one or more front tabs extending upwardly from the upper end of the front face, said front tabs configured to engage a front surface of the e-poll book tablet when installed. The bracket further includes a slot in the bottom face of the bracket, said bracket slot configured to align with a voter access card slot in an end of the encoder. The slot in the bottom face of the bracket may be beveled.

An opening may be provided in the front face of the bracket which provides view of and access to a front face of the encoder.

According to one aspect of the invention, two rear tabs and two front tabs are provided. The rear tabs preferably extend further than the front tabs. The upper end of each side face may have a shape corresponding to a side edge of the e-poll book tablet. A step-like protrusion may be provided extending from the rear face into the pocket at a location proximate to the ends of the rear tabs.

An opening may further be provided in one of the side faces. That opening may be aligned with a power port in the encoder when the bracket is installed on the encoder and is sized to allow a power cord to pass therethrough.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

As best shown in FIGS. 2-9, one presently preferred embodiment of the invention comprises a stabilizer bracket 30 for use in connection with an e-poll book system 10 having a tablet computer 12 and encoder 20. The stabilizer bracket 30 includes a first, primary opening or pocket 31 that is sized to receive the body of the encoder 20 therein. The front face of the opening 31 may further include an opening that allows the user to see the front face of the encoder 20, and the encoder indicator light, when the stabilizer bracket 30 is installed.

A pair of tabs 32a, 32b extend from the rear face of the stabilizing bracket 30 to provide stability. According to one presently preferred embodiment, the tabs 32a, 32b extend approximately 1⅜" over the edge of the e-poll book tablet 12 when installed to achieve the desired stability. A second pair of tabs 33a, 33b extend from the front face of the stabilizing bracket to provide enhanced stability while not interfering with the operations of the e-poll book. According to one preferred embodiment, the second pair of tabs 33a, 33b each extend approximately ⅜" over the edge of the e-poll book tablet 12 when installed.

Figure 4:
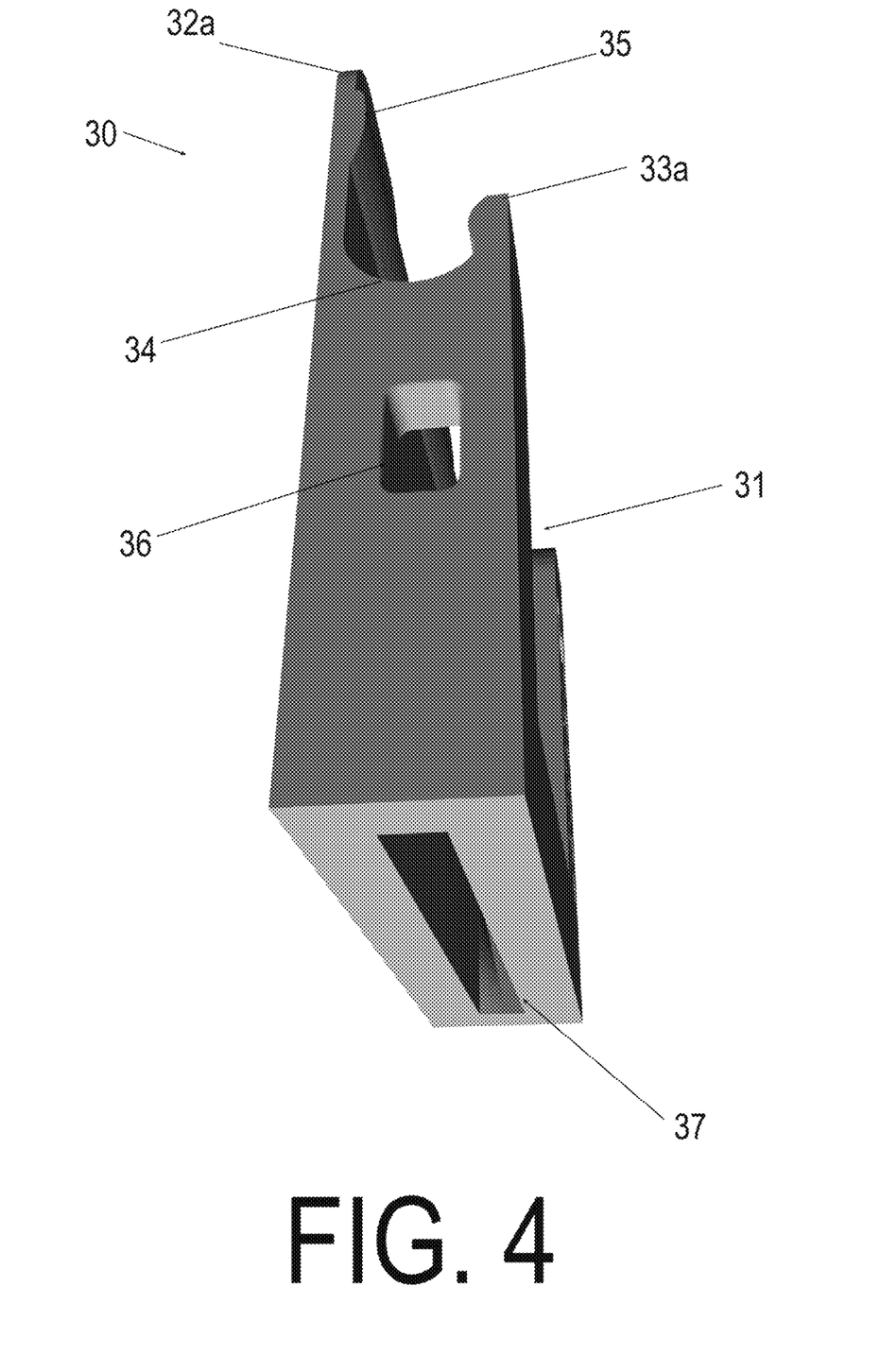
FIG. 4 is a front lower left perspective view of the stabilizer bracket shown in FIG. 2 and FIG. 3.
Figure 5:
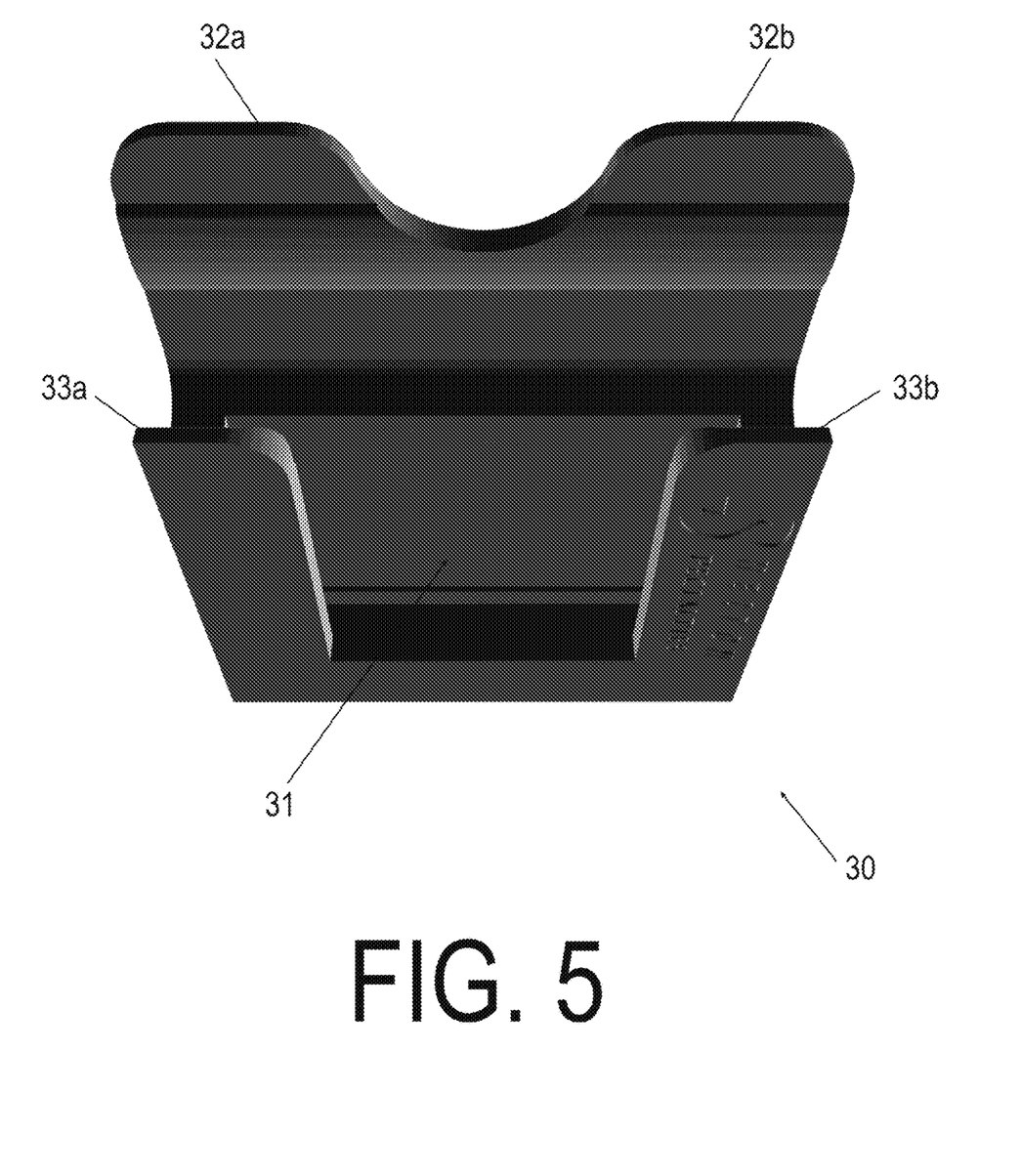
FIG. 5 is an upper front perspective view of the stabilizer bracket shown in FIG. 2-FIG. 4.
Figure 6:
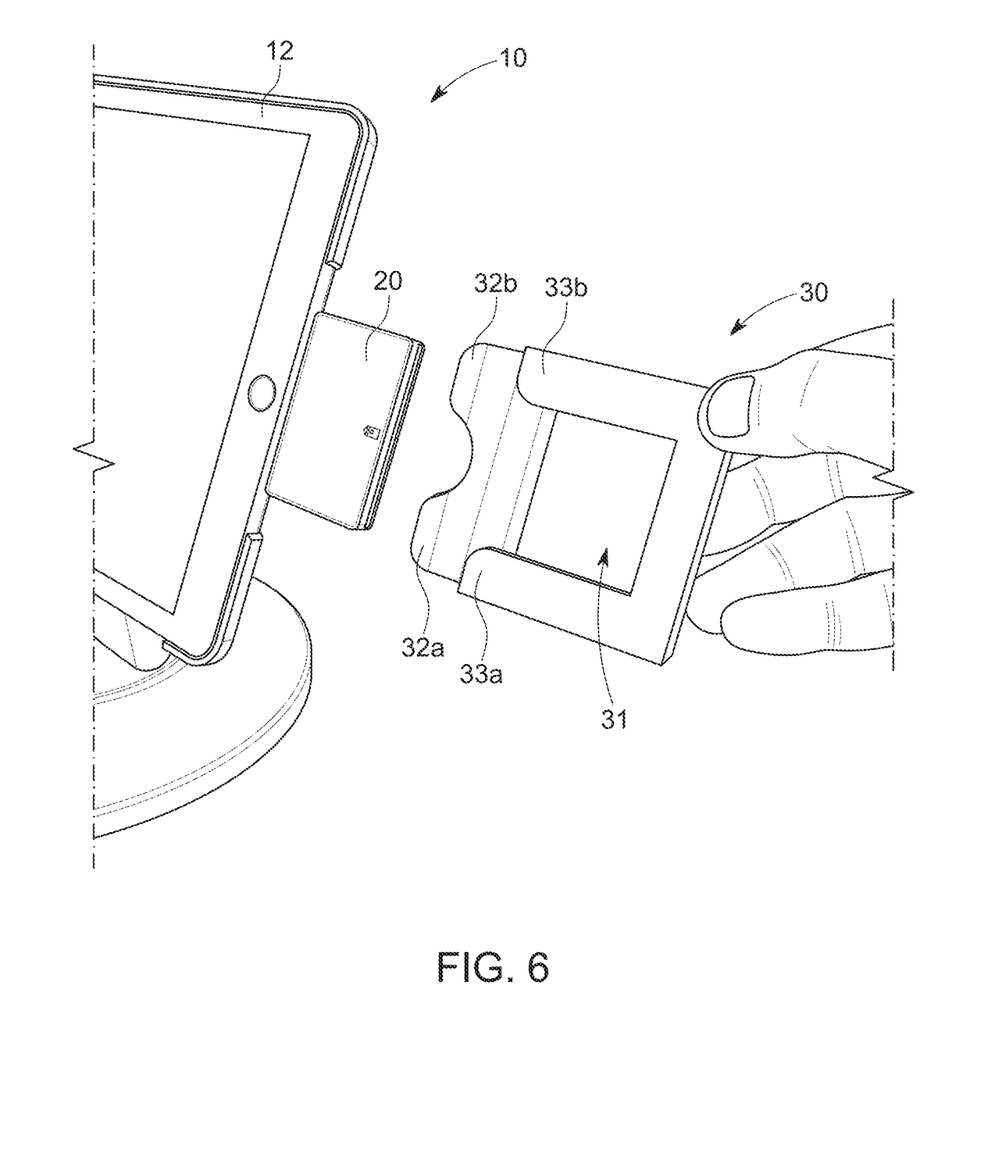
FIG. 6 is a front perspective view of an e-poll book with an encoder attached to the dock connector port and a stabilizer bracket according to a preferred embodiment of the invention aligned and ready to install.
Figure 7:
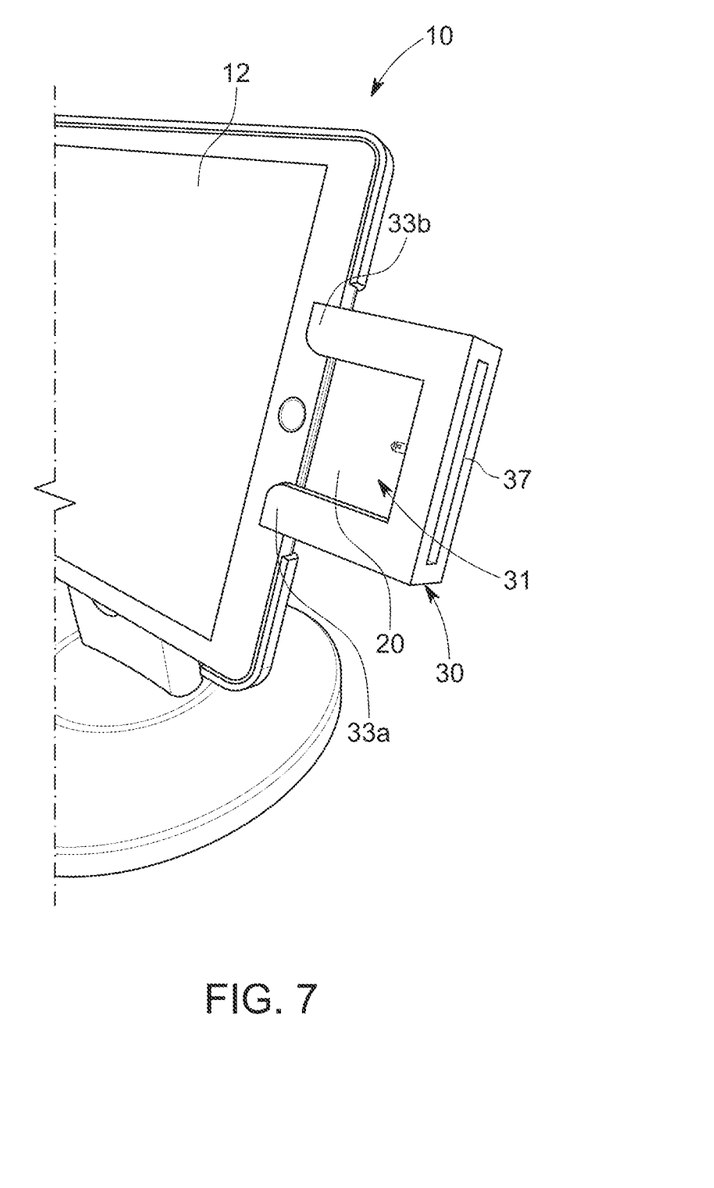
FIG. 7 is a front perspective view of an e-poll book with an encoder attached to the dock connector port and a stabilizer bracket installed according to a preferred embodiment of the invention.
Figure 8:
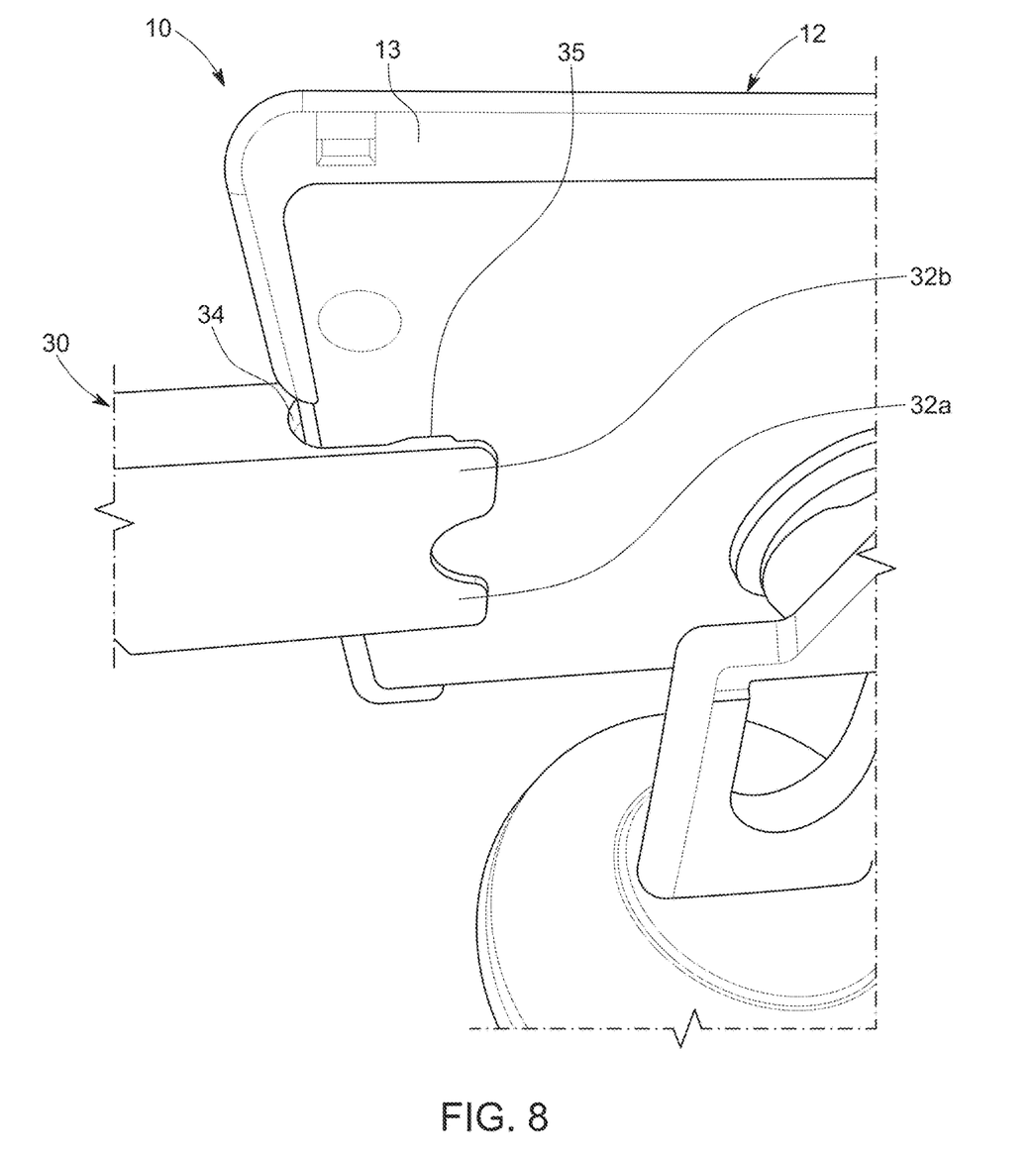
FIG. 8 is a rear perspective view of an e-poll book with an encoder attached to the dock connector port and a stabilizer bracket installed according to a preferred embodiment of the invention.

As best shown in FIG. 4 and FIG. 8, the space 34 between rear tabs 32a, 32b and front tabs 33a, 33b is contoured to match the outer contour of the e-poll book tablet 12 to provide further stability. By mounting flush against the side of the e-poll book tablet 12, at the point where the encoder 20 plugs in, side-to-side stability for the encoder 20 is provided.

A small step-like protrusion 35 that extends from the rear face of the stabilizer bracket into the primary opening 31 may be provided. This feature allows for the stabilizer bracket 30 to be used with existing e-poll book tablet case 13, also known as a sled.

An opening 36 is provided in a side wall of the stabilizer bracket to allow for power connection to encoder via a power supply cable 40, which can be plugged in when the stabilizer bracket is used. The power cable opening 36 secures the power cable 40 and prevents connectivity issues.

Figure 9:
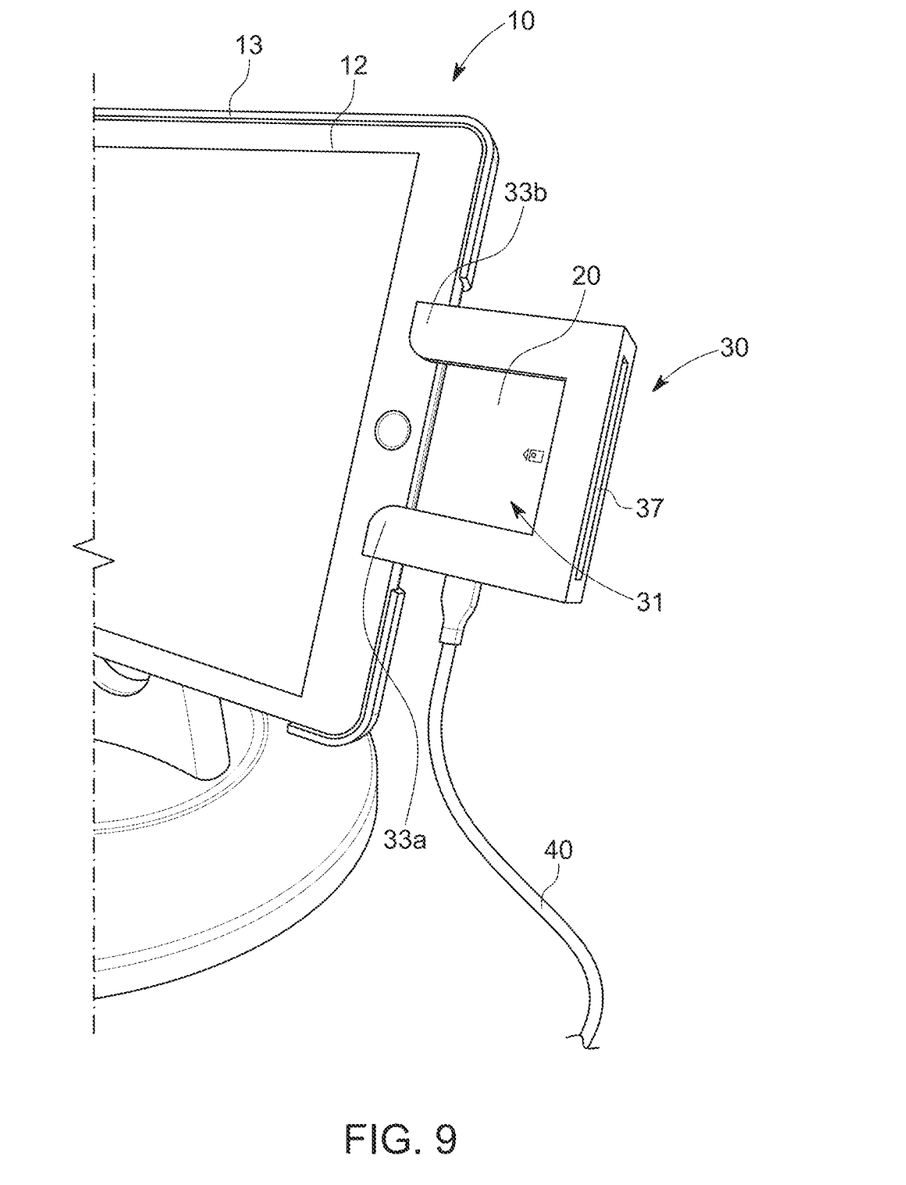
FIG. 9 is a front perspective view of an e-poll book with an encoder attached to the dock connector port and a stabilizer bracket installed and a power cord plugged into the encoder according to a preferred embodiment of the invention.

As best shown in FIG. 4, the stabilizer bracket 30 includes a slot 37 in the bottom surface thereof. When the stabilizer bracket 30 is installed, as best shown in FIG. 9, the slot 37 in the stabilizer bracket 30 aligns with the voter access card encoder slot 24 provided in the end of the encoder 20. The slot 37 may be beveled (not shown) to allow for easier insertion of the vote card into the encoder 20. The slot 37 acts as a guide for the card to be easily inserted into the encoder 20.

Figure 3:
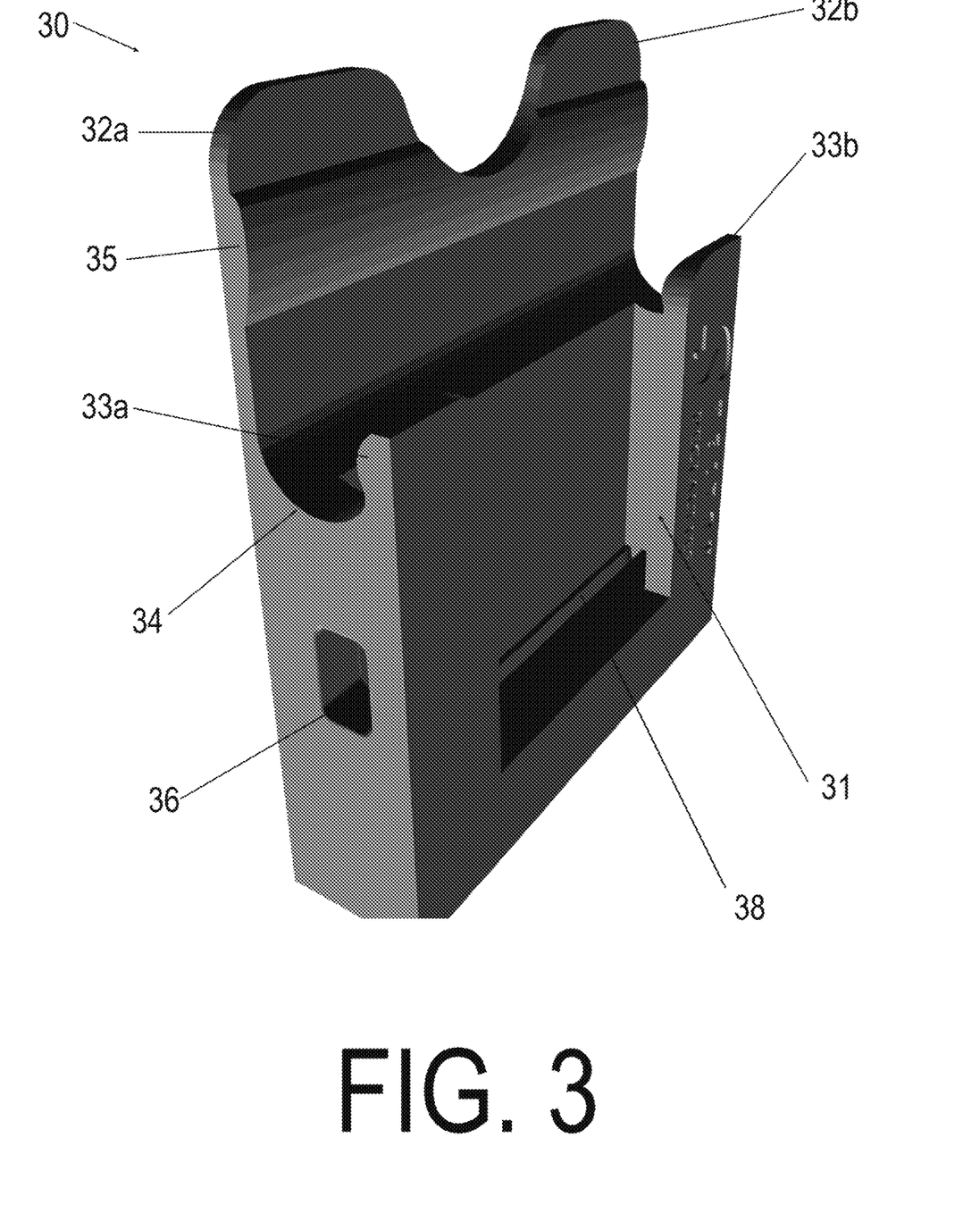
FIG. 3 is a front upper left perspective view of the stabilizer bracket shown in FIG. 2.

As best shown in FIG. 3, the interior of the opening 31 in the stabilizer bracket 30 includes a step 38 that allows for removal of the encoder 20 from the stabilizer bracket 30. Accordingly, no tools are required to remove the encoder 20 from the bracket 30.

The over-all design of the stabilizer bracket 30 allows for the encoder 20 to be securely mounted to the e-poll book tablet 12. The opening 31 in the stabilizer bracket 30 is sized so that the encoder 20 fits snuggly into the bracket 30. The small design of the stabilizer bracket 30 allows it to be easily stored in the existing e-poll book carrying case provided by the manufacturer.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

I claim:

1. A bracket in combination with and for stabilizing an encoder coupled to an e-poll book tablet comprising:
    a. a front face having an upper end, a lower end, and opposing side edges;
    b. a rear face having an upper end, a lower end, and opposing side edges;
    c. a bottom face having a first end connected to the lower end of the front face and a second end connected to the lower end of the rear face;
    d. a pair of side faces, each having an upper end, a first side edge connected to one of said opposing side edges of the front face, a second side edge connected to one of said opposing side edges of the rear face, and a lower end connected to opposing edges of the bottom face, wherein said front face, rear face and side faces form a pocket having dimensions approximating outer dimensions of the encoder;
    e. one or more rear tabs extending upwardly from the upper end of the rear face, said rear tabs engaging a rear surface of the e-poll book tablet when installed;
    f. one or more front tabs extending upwardly from the upper end of the front face, said front tabs engaging a front surface of the e-poll book tablet when installed; and
    g. a slot in the bottom face of the bracket, said bracket slot aligning with a voter access card slot in an end of the encoder when installed.

2. The bracket according to claim 1 further comprising an opening in the front face of the bracket which provides view of and access to a front face of the encoder.

3. The bracket according to claim 1 wherein said one or more rear tabs comprises two rear tabs and said one or more front tabs comprises two front tabs.

4. The bracket according to claim 1 wherein said one or more rear tabs extend further than said one or more front tabs.

5. The bracket according to claim 4 wherein the upper end of each side face has a shape corresponding to a side edge of the e-poll book tablet.

6. The bracket according to claim 5 further comprising a protrusion extending from the rear face into the pocket at a location proximate to the ends of said one or more rear tabs.

7. The bracket according to claim 6 further comprising an opening in one of the side faces, said opening aligned with a power port in the encoder when the bracket is installed on the encoder and being sized to allow a power cord to pass therethrough.

8. The bracket according to claim 4 further comprising a protrusion extending from the rear face into the pocket at a location proximate to ends of said one or more rear tabs.

9. The bracket according to claim 1 further comprising an opening in one of the side faces, said opening aligned with a power port in the encoder when the bracket is installed on the encoder and being sized to allow a power cord to pass therethrough.

\* \* \* \* \*